Patented June 5, 1923.

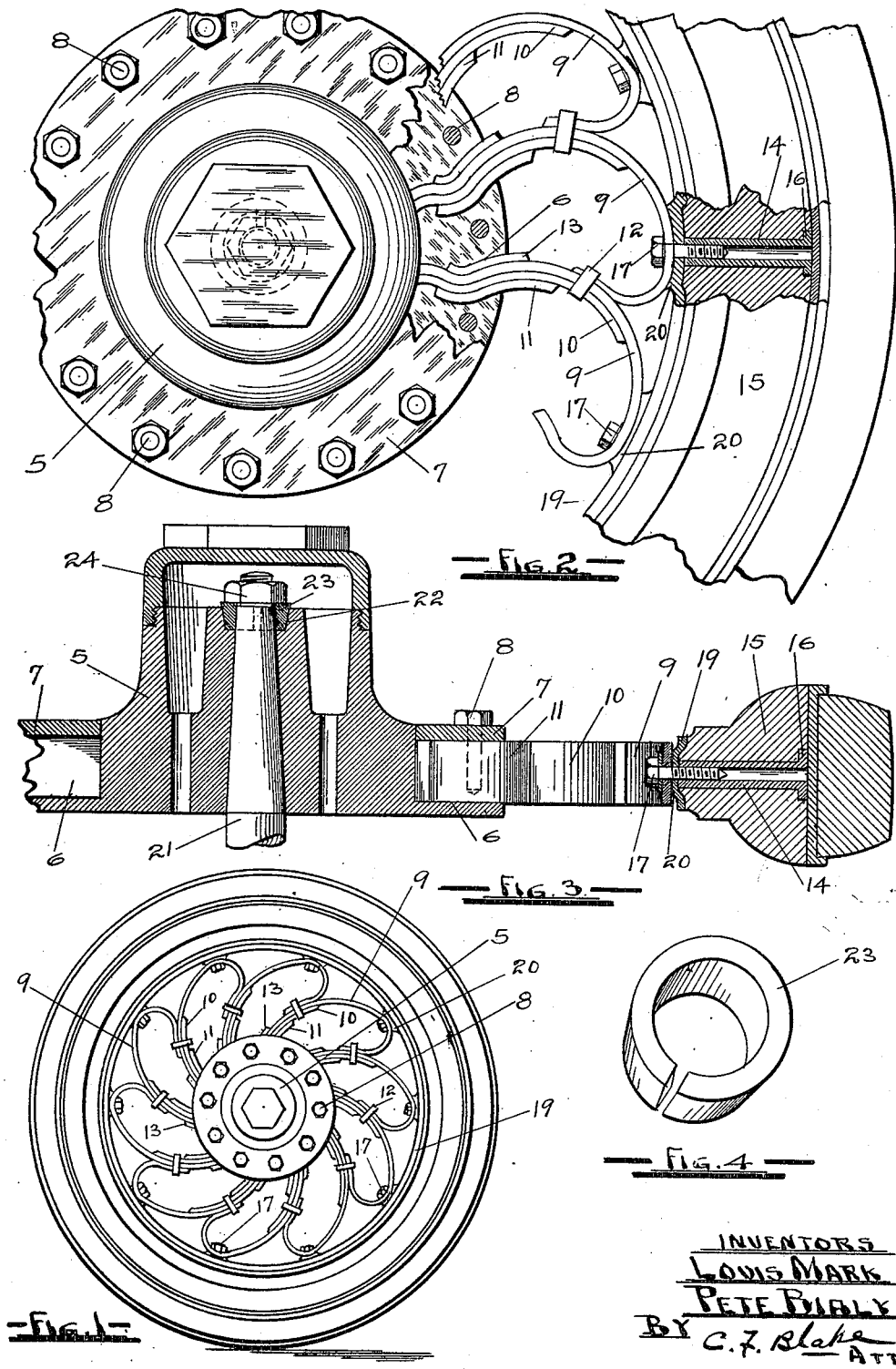

1,457,538

UNITED STATES PATENT OFFICE.

LOUIS MARK AND PETE BIALY, OF PORTLAND, OREGON.

SPRING WHEEL.

Application filed October 28, 1922. Serial No. 597,687.

*To all whom it may concern:*

Be it known that we, LOUIS MARK and PETE BIALY, citizens of the United States, residing at Portland, county of Multnomah, State of Oregon, have jointly invented certain new and useful Improvements in Spring Wheels, of which the following is a specification.

Our invention is an improvement upon the device disclosed by us in Patent No. 1,407,669, of Feb. 21, 1922, the object being to provide a device similar to that disclosed in said patent with improved means of attaching the spring spokes to the wheel rim, with an improved reinforced spoke, and with improved means of securing the wheel hub upon the axle.

We accomplish the above objects by means of the construction illustrated in the accompanying drawing, which is a part of this application for Letters Patent, like characters of reference indicating like parts throughout the several views thereof, and in which:

Fig. 1 is a side elevation of a wheel embodying our invention.

Fig. 2 is a fragmentary elevation thereof upon an enlarged scale.

Fig. 3 is a fragmentary sectional elevation thereof upon the same scale as Fig. 2.

Fig. 4 is a perspective detail of the retaining thimble.

The hub 5 of our wheel is composed of a body having substantially radial pockets 6 opening upon one face of the hub and also upon the peripheral surface thereof, each of said pockets being adapted in form to receive the inner end of one of the spring spokes.

An annular ring 7 is secured to that face of the hub 5 upon which the pockets 6 open by means of suitable bolts 8, for the purpose of securing the spokes in their respective pockets 6.

Each spoke is composed of a flat spring member 9 curved away from the peripheral surface of the hub, and having its outer end curved back towards the hub, and adapted to rest upon the outwardly curved portion of the adjacent member 9, as shown in Figs. 1 and 2.

Each member 9 is reinforced upon its concave side by spring members 10 and 11, the member 10 overlapping the end of the adjacent member 9, so that a spring clip 12 may embrace the outwardly curved portion on one member 9, the inwardly curved end of the adjacent member 9, and the respective member 10, as shown in Figs. 1 and 2.

Each member 9 is also reinforced upon its convex side by a spring member 13.

Where the spring members 9, 10, 11 and 13 are disposed within their respective pockets 6 said members are curved, and the pockets are formed to suit such curves, as shown in detail in Fig. 2.

To secure the spokes to the felloe of the wheel we provide thimbles 14 imbedded in the felloe 15, and having a countersunk flange 16 in the outer peripheral surface of the felloe, as shown in Figs. 2 and 3. A suitable bolt 17 is passed through the respective spoke and threaded into the inner end of one of said thimbles.

An inner rim 19 is provided for the felloe, and at the bearing point of each spoke thereon said ring is indented to provide a raised portion 20 as a seat for the spring spoke.

To secure our wheel upon the tapered end of an axle 21 we provide a tapered counterbore 22 in the outer end of the hub 5, said tapered counterbore being oppositely directed to the taper of the axle 21, and therein we place an outwardly and inwardly tapered split washer 23, which washer is pressed into place by a nut 24 upon the end of the axle 21, the combined tapers of the washer 23 causing it to grasp both the hub 5 and the axle 21 when thus pressed into place by the nut 24.

Our invention may be made of any size, and constructed of any materials deemed convenient and suitable for a device of this character, and while we have illustrated and described a form of construction and arrangement of parts found desirable in materializing our invention, we wish to include in this application all mechanical equivalents and substitutes that may fairly be considered to come within the scope and purview of our invention as defined in the appended claim.

Having disclosed our invention so that others may be enabled to construct and to use the same, what we claim as new, and desire to secure by Letters Patent is:

In a wheel: a hub having pockets therein; a felloe; an annular ring reinforcing said felloe within said felloe; outwardly curved spring spokes, each mounted within one of the pockets of said hub, each spoke having an inwardly curved end resting upon the outwardly cuved portion of the adjacent spoke; a thimble mounted within said felloe respective to each of said spokes; a raised seat upon said annular ring for each of said spokes; and a bolt for each of said spokes, said bolt passing through the spoke and its raised seat upon said annular ring and being threaded into one of said thimbles.

In witness whereof we claim the foregoing as our own we hereunto affix our signatures in the presence of two witnesses at Portland, county of Multnomah, State of Oregon, this 17th day of Oct. 1922.

LOUIS MARK.
PETE BIALY.

Witnesses:
L. J. ROBINSON,
C. F. BLAKE.